(12) United States Patent
Kikuchi (10) Patent No.: US 6,897,992 B2
(45) Date of Patent: May 24, 2005

(54) ILLUMINATING OPTICAL UNIT IN IMAGE DISPLAY UNIT, AND IMAGE DISPLAY UNIT

(75) Inventor: Hiroki Kikuchi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/678,308

(22) Filed: Oct. 6, 2003

(65) Prior Publication Data

US 2004/0109219 A1 Jun. 10, 2004

(30) Foreign Application Priority Data

Oct. 28, 2002 (JP) ..................................... P2002-313006

(51) Int. Cl.$^7$ ........................... G02B 26/00; G02B 6/10; G02F 1/01; G09G 5/00; H01S 3/10
(52) U.S. Cl. ...................... 359/237; 359/238; 359/246; 359/277; 359/279; 359/290; 359/569; 385/146; 345/7; 372/9; 372/103; 372/107; 353/31; 355/53
(58) Field of Search ................................. 359/237, 238, 359/246, 276, 277, 279, 290, 569, 621, 622; 385/146; 345/7, 88; 372/9, 103, 107; 353/31, 84; 355/53

(56) References Cited

U.S. PATENT DOCUMENTS

| | | | | |
|---|---|---|---|---|
| 4,521,075 A | * | 6/1985 | Obenschain et al. | ........ 359/569 |
| 4,744,615 A | * | 5/1988 | Fan et al. | .................... 385/146 |
| 5,224,200 A | * | 6/1993 | Rasmussen et al. | ......... 385/146 |
| 5,272,473 A | * | 12/1993 | Thompson et al. | ............ 345/7 |
| 6,577,429 B1 | * | 6/2003 | Kurtz et al. | ................ 359/279 |
| 6,594,090 B2 | * | 7/2003 | Kruschwitz et al. | ......... 359/707 |

\* cited by examiner

Primary Examiner—Loha Ben
(74) Attorney, Agent, or Firm—Rader, Fishman & Grauer PLLC; Ronald P. Kananen (57) ABSTRACT

Disclosed is an illuminating optical unit in an image display unit for displaying an image by irradiating a GLV (spatial modulation device) with a laser beam and modulating the laser beam based on an image signal inputted to the GLV, which includes a polarized light rotation means for equally dividing a polarized light component of the laser beam into a P polarized light component and an S polarized light component, a polarized light beam splitter for separating from each other the P polarized light component and the S polarized light component equally divided by the polarized light rotation means, and an optical path difference generation means for generating an optical path difference not less than the coherence length of the laser beam between the laser beam of the P polarized light component and the laser beam of the S polarized light component.

10 Claims, 8 Drawing Sheets

PIXEL OFF

FIG. 6B

PIXEL ON

FIG. 10

ILLUMINATING OPTICAL UNIT IN IMAGE DISPLAY UNIT, AND IMAGE DISPLAY UNIT

BACKGROUND OF THE INVENTION

The present invention relates to an illuminating optical unit in an image display unit for displaying an image by use of light modulated by a spatial modulation device, and to the image display unit. More particularly, the invention relates to a technology for enhancing the quality of an image.

As a form of image display unit, hitherto there has been proposed a projection display in which a screen is irradiated with a light beam modulated by a spatial modulation device, such as a liquid crystal panel, a DMD (Digital Micromirror Device), etc., to display an image on the screen. In such a projection display, conventionally, a lamp, such as a metal halide lamp, a halogen lamp and a xenon lamp, has been used as a light source.

Where such a lamp is used as a light source, however, there is the problem that the life of the light source is short and, hence, maintenance thereof is troublesome. In addition, an optical system for picking up three primary colors of light from the white light generated from the lamp is complicated, color reproduction region is limited and light utilization efficiency is lowered.

In order to solve the above problems, it has been attempted to use a laser light source, such as a semiconductor laser, as a light source for a projection display. A laser light source has a longer life as compared with lamps, and has an excellent directionality, which enables efficient utilization of the light radiated, thus promising a high energy utilization efficiency. In addition, the laser light source has a number of merits such as its monochromatic property, which permits a wide color reproduction region.

Besides, in recent years, attention has been paid to the development of a display using an active drive type grating (diffraction grating) based on the micro-machine technology. The grating type device used here is called a "Grating Light Valve" (hereinafter abridged to "GLV"), and has the advantages that, as contrasted to the case of using a conventional spatial modulator, it is possible to display a seamless, sharp and bright image, the device can be manufactured inexpensively by use of the micro-machine technology, the device can perform a high-speed operation, and so on.

It has been contemplated to use a laser light source, such as the above-mentioned semiconductor laser, as a light source for illuminating the above-mentioned GLV.

However, where a laser light source is used as a light source for an image display unit such as the above-mentioned projection display, there occurs the problem that speckles (or speckle noise) are generated, which degraded the image quality.

The speckle noise is a phenomenon generated through the process in which a coherent beam with an aligned phase from a laser light source is scattered by a random phase plane (object surface) and disturbed wave fronts coming from adjacent regions of the object surface interfere with each other on an observation plane; thus, the speckle noise appears on the observation plane as a granular intensity distribution.

In the projection display using the laser light source, when such a speckle noise as above is generated between the screen constituting the object surface and the observer's eye (retina) constituting the observation plane, the observer recognizes it as a degradation of an image. Therefore, how to suppress the speckle noise is important in realizing an image display unit such as a projection display using a laser light source.

Incidentally, there is a laser beam with a low spatial coherence, and it may be considered that the use of such a laser beam for an image display unit such as a projection display can realize a two-dimensional image with little speckle noise. However, the laser beam with a low spatial coherence lacks stability, i.e., it is liable to generate noise and the beam shape and intensity distribution thereof are liable to vary. Thus, the laser beam with a low spatial coherence is unsuitable for use as a light source for the image display unit such as a projection display.

In the technological status at present, a visible laser beam which is stable in beam shape, intensity distribution and the like and which has a high output is generally high in spatial coherence, leading to the above-mentioned problem of speckle noise.

SUMMARY OF THE INVENTION

It is an object of the present invention to suppress speckle noise and suppress degradation of image quality in an image display unit such as a projection display.

In order to attain the above object, according to one aspect of the present invention, there is provided an illuminating optical unit in an image display unit for displaying an image by irradiating a spatial modulation device with a laser beam and modulating the laser beam based on an image signal inputted to the spatial modulation device, including: a polarized light rotation means for equally dividing a polarized light component of the laser beam into a P polarized light component and a S polarized light component; a polarized light separation means for separating from each other the P polarized light component and the S polarized light component equally divided by the polarized light rotation means; and an optical path difference generation means for generating an optical path difference not less than the coherence length of the laser beam between a laser beam of the P polarized light component and a laser beam of the S polarized light component.

In accordance with another aspect of the present invention, there is provided an image display unit for displaying an image by irradiating a spatial modulation device with a laser beam and modulating the laser beam based on an image signal inputted to the spatial modulation device, wherein an illuminating optical unit for irradiating the spatial modulation device with the laser beam includes: a polarized light rotation means for equally dividing a polarized light component of the laser beam into a P polarized light component and a S polarized light component; a polarized light separation means for separating from each other the P polarized light component and the S polarized light component equally divided by the polarized light rotation means; and an optical path difference generation means for generating an optical path difference not less than the coherence length of the laser beam between a laser beam of the P polarized light component and a laser beam of the S polarized light component.

According to the illuminating optical unit in an image display unit and the image display unit of the present invention, the laser beam of the P polarized light component and the laser beam of the S polarized light component are separated from each other and, in addition, the optical path difference not less than the coherence length is generated between both of the polarized light components. This makes it possible to make both of the laser beams have no correlation with each other and, therefore, to suppress speckle noise.

In the illuminating optical unit and the image display unit according to the present invention, the polarized light separation means and the optical path difference generation means may be constituted in the form of one prism. This constitution reduces the number of component parts.

The illuminating optical unit and the image display unit according to the present invention may further include a beam intensity separation means for dividing the intensity of the laser beam to form two or more laser beams parallel to each other and generating an optical path difference not less than the coherence length of the laser beam between the two or more separated laser beams. This makes it possible to separate the laser beam into a plurality of laser beams and to form the optical path difference not less than the coherence length between the optical paths of the plurality of separated laser beams. Therefore, the plurality of laser beams reach a screen at mutually different angles, which makes it possible to generate different speckle patterns and thereby to suppress further the speckle noise.

In the illuminating optical unit and the image display unit according to the present invention, the absolute value of the difference between the optical path difference generated by the optical path difference generation means and the optical path difference generated by the beam intensity separation means may be not less than the coherence length. This ensures that, even where the separation ratio in the separation by the polarized light separation means does not reach 100%, the polarized light component on one side which has not been separated and the polarized light component on one side which has been separated would not form an interference fringe, so that noise on the screen can be suppressed.

In the illuminating optical unit and the image display unit according to the present invention, the spatial modulation device may be a grating light valve. This makes it possible to display a seamless, sharp and bright image. In addition, since the grating light valve can be inexpensively manufactured by use of the micro-machine technology, the manufacturing cost of the image display unit can be lowered.

The above and other objects, features and advantages of the present invention will become apparent from the following description and appended claims, taken in conjunction with the accompanying drawings.

BRIEF DESCRIPTION OF THE DRAWINGS

FIGS. 6A and 6B are general views for illustrating a grating light valve, in which FIG. 6A shows the state where pixels are OFF, and FIG. 6B shows the state where the pixels are ON;

DETAILED DESCRIPTION OF THE PREFERRED EMBODIMENTS

The present invention pertains to an image display unit for displaying an image by irradiating a spatial modulation device with a laser beam and modulating the laser beam based on an image signal inputted to the spatial modulation device and to an illuminating optical unit for use therein. Examples of the image display unit include front projection type or rear projection type laser displays and, further, a wide variety of image display units including printing and recording, such as a laser beam printer, an apparatus for recording images onto a movie film based on digital image data, and so on.

Examples of the spatial modulation device include a liquid crystal, a DMD and the like, in addition to the above-mentioned GLV.

Now, embodiments of the present invention will be described below, referring to the accompanying drawings.

FIGS. 1 to 10 illustrate embodiments of the present invention in which the present invention is applied to an illuminating optical unit in an image display unit using a GLV as a spatial modulation device and to the image display unit.

First, the image display unit 1 will be outlined.

Figure 1:
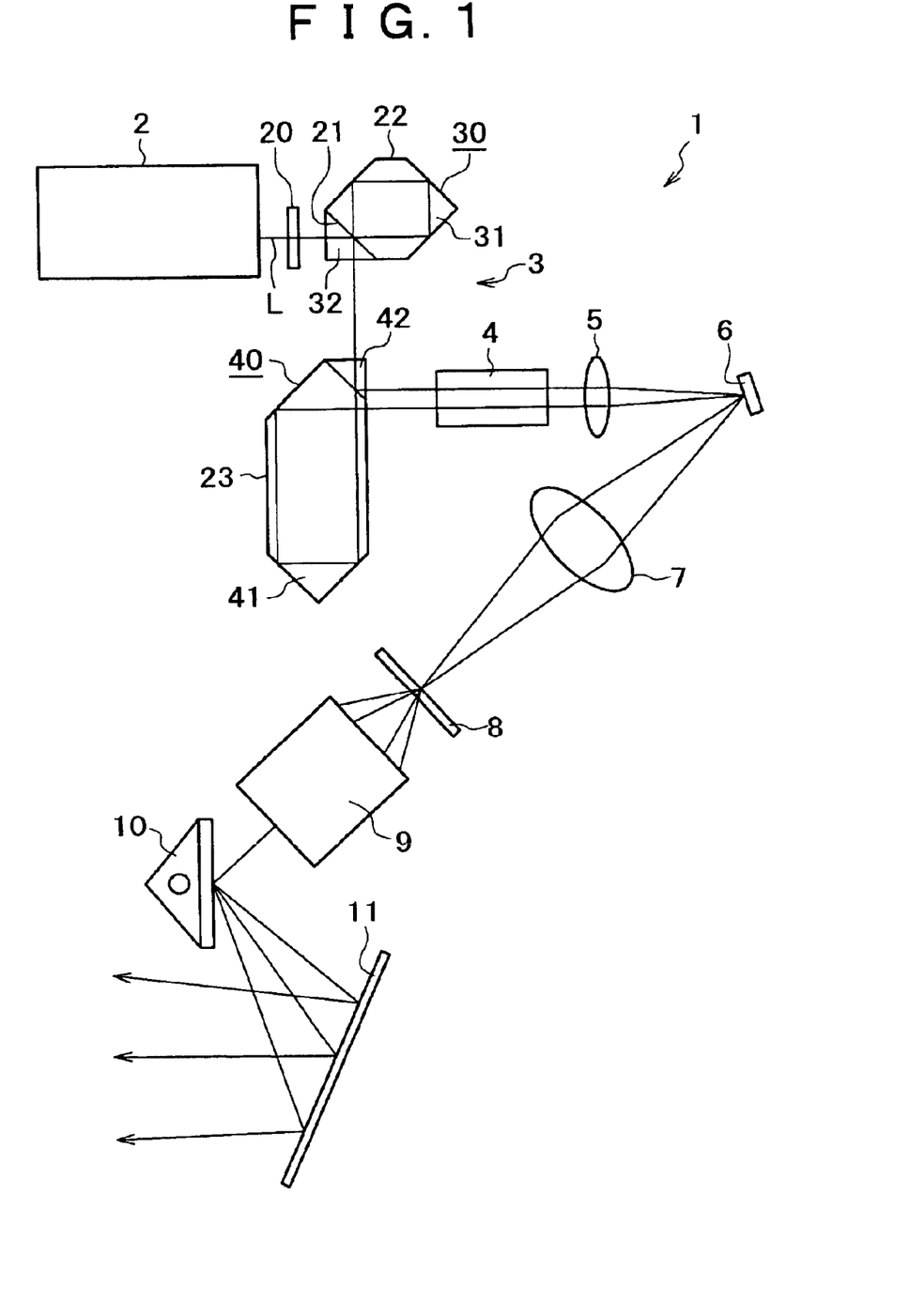
FIG. 1, together with FIGS. 2 to 10, illustrate an embodiment of an illuminating optical unit in an image display unit and the image display unit according to the present invention, and is a general view for illustrating the whole part of the image display unit.

The image display unit 1 includes a laser light source 2 for emitting a laser beam, an optical system 3 for separating the laser beam L emitted from the laser light source 2 into a plurality of laser beams, a line generator expander optical system 4 for uniformizing the intensity distribution of the laser beam L, a focus lens 5 for converting the laser light L from the laser light source 2 into a line-form light source, a GLV 6 for generating ±first order diffracted beams ±Lo1 and performing one-dimensional spatial modulation so as to form a one-dimensional image, a relay optical system 7 for re-imaging the one-dimensional image formed by the GLV 6, an optical filter (hereinafter referred to as "schlieren filter") 8 for transmitting therethrough only the ±first order diffracted beams ±Lo1 generated by the GLV 6 and shielding a 0th order beam, a projection lens system 9 for projecting the ±first order diffracted beams ±Lo1 filtered by the schlieren filter 8, a galvano-mirror 10 for converting the one-dimensional image into a two-dimensional image, and a screen 11 for displaying the two-dimensional image (see FIG. 1).

As for the laser light source 2, in order to display a full-color two-dimensional image, three laser light sources, i.e., a laser light source for red laser beam, a laser light source for green laser beam, and a laser light source for blue laser beam, are needed.

The coherence length of the laser beam emitted from each of the color laser light sources is in the range of 20 to 600 mm. In this embodiment, description will be made assuming that the coherence length of the laser beam from the laser light source 2 is 60 mm, for example.

Examples of the laser light source for red laser (wavelength: 640 nm) include a red laser diode array.

Examples of the laser light source for green laser (wavelength: 532 nm) and the laser light source for blue laser (wavelength: 457 nm) include those in which the output (wavelength: 1064 nm or 914 nm) of an LD-excited Nd:YVO4 (or Nd:YAG) microchip laser performing passive Q switch excitation is amplified by a LD-excited Nd:doped fiber amplifier followed by wavelength conversion by secondary harmonic wave generation process. This type of laser light source is characterized in that alignment is easy, a stiff optical fiber is used as an amplification medium, and it is possible to emit a high-output laser beam at low cost. In addition, this type of laser light source can be mass-produced and is ideal as a light source for a laser display.

The optical system 3 for separating the laser beam L into a plurality of laser beams includes a polarized light rotation means 20 for equally dividing a polarized light component of the laser beam L into a P polarized light component Lp and an S polarized light component Ls, a polarized light separation means 21 for separating the P polarized light component Lp and the S polarized light component Ls from each other, an optical path difference generation means 22 for generating an optical path difference L1 between the P polarized light component Lp and the S polarized light component Ls, and a beam intensity separation means 23 for separating from each other the intensities of the P polarized light component Lp and the S polarized light component Ls (see FIG. 1).

The polarized light rotation means 20 may be, for example, a λ/2 wavelength plate, a quartz wavelength plate, a Fresnel rhomb wavelength plate and the like are applicable. Where the laser beam L emitted from the laser light source 2 already has a P polarized light component and a S polarized light component equally, the polarized light rotation means 20 is regarded as incorporated in the laser light source 2.

Figure 2:
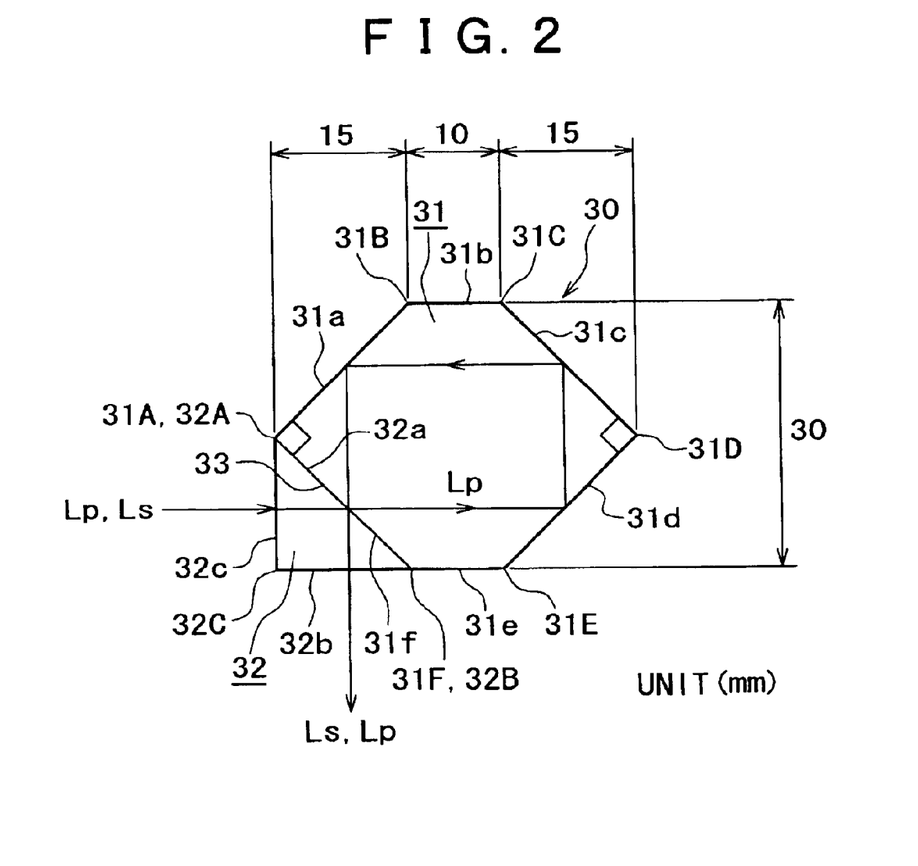
FIG. 2 together with FIG. 3 are a plan view showing a first prism in an enlarged state.
Figure 3:
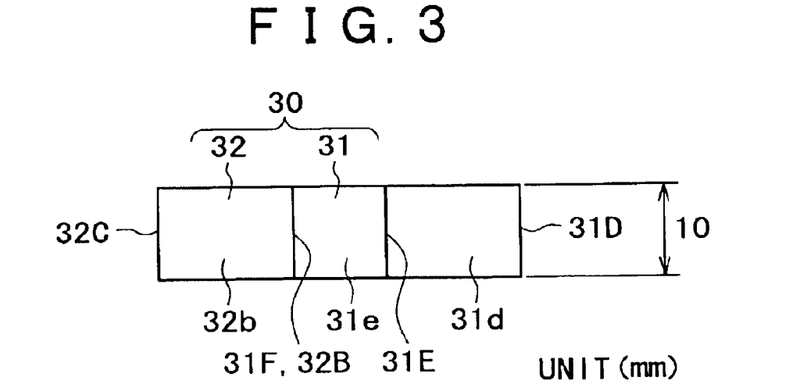
FIG. 3 is a side view as viewed from a plate thickness direction.

The polarized light separation means 21 and the optical path difference generation means 22 are incorporated in a first prism 30 having a predetermined shape (see FIGS. 1 and 2).

More specifically, the first prism 30 includes a main prism 31 having a fixed plate thickness and a flat hexagonal prismatic shape, and a sub prism 32 having a plate thickness equal to that of the main prism 31 and a flat isosceles right triangular prismatic shape. One face of the main prism 31 where the plate thickness appears and one face of the sub prism 32 where the plate thickness appears are adhered to each other to form a irregular-shaped hexagonal prism (see FIGS. 2 and 3).

The first prism 30 functions as a polarized light separation-synthesis means for separating the laser beam into a laser beam of a P polarized light component and a laser beam of a S polarized light component and for again synthesizing both of the laser beams.

The main prism 31 has a shape in which each pair of opposed sides are parallel to each other and are equal in length. Specific dimensions of each portion of the main prism 31 are as follows. The corner at the left end in FIG. 2 is named "first corner 31A", and the other corners are named, in the clockwise order, "second corner 31B", "third corner 31C", . . . , and "sixth corner 31F". The face between the first corner 31A and the second corner 31B is named "first face 31a", and the other faces are named, in the clockwise order, "second face 31b", "third face 31c", . . . , and "sixth face 31f" (see FIG. 2).

Angle of the first corner 31A=90°
Angle of the second corner 31B=135°
Angle of the third corner 31C=135°
Angle of the fourth corner 31D=90°
Angle of the fifth corner 31E=135°
Angle of the sixth corner 31F=135°
Spacing between the first corner 31A and the second corner 31B: 15 mm/sin 45°≈21.21 mm
Spacing between the second corner 31B and the third corner 31C: 10 mm
Spacing between the third corner 31C and the fourth corner 31D: 15 mm/sin 45°≈21.21 mm
Spacing between the fourth corner 31D and the fifth corner 31E: 15 mm/sin 45°≈21.21 mm
Spacing between the fifth corner 31E and the sixth corner 31F: 10 mm
Spacing between the sixth corner 31F and the first corner 31A: 15 mm/sin 45°≈21.21 mm
Spacing between the second face 31b and the fifth face 31e: 30 mm
Spacing between the first angle 31A and the fourth angle 31D: 40 mm In addition, the specific dimensions of the sub prism 32 are as follows. The corner at the top end in FIG. 2 is named "first angle 32A", and the other corners are named, in the clockwise order, "second corner 32B", and "third corner 32C". The face between the first corner 32A and the second corner 32B is named "first face 32a", and the other faces are named, in the clockwise order, "second face 32b", and "third face 32c" (see FIG. 2).

Figure 4:
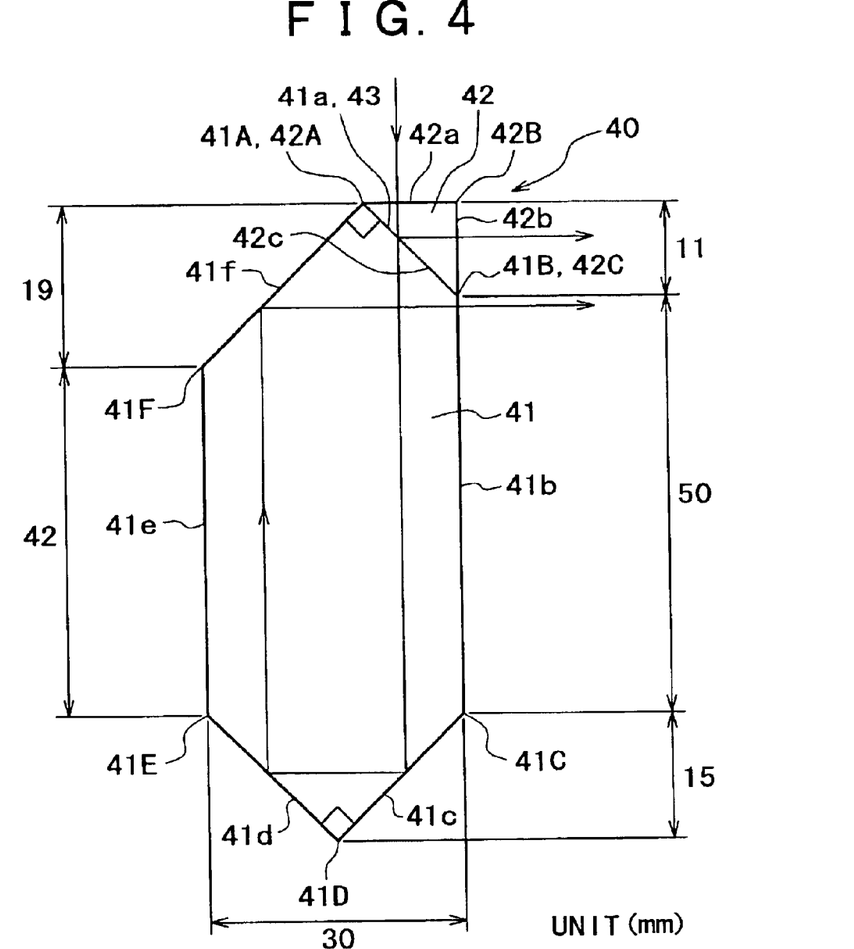
FIG. 4 together with FIG. 5 are a plan view showing a second prism in an enlarges state.
Figure 5:
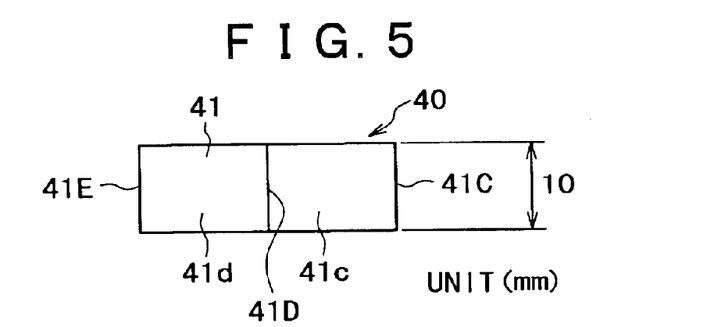
FIG. 5 is a side view as viewed from a plate thickness direction.

Angle of the first corner 32A=45°
Angle of the second corner 32B=45°
Angle of the third corner 32C=90°
Spacing between the first corner 32A and the second corner 32B: 15 mm/sin 45°≈21.21 mm
Spacing between the second corner 32B and the third corner 32C: 15 mm
Spacing between the third corner 32C and the first corner 32A: 15 mm The first face 32a of the sub prism 32 is adhered to the sixth face 31f of the main prism 31, and a polarized light beam splitter 21 is provided at the adhesion face 33, to constitute the first prism 30 (see FIG. 4). The polarized light beam splitter 21 provided at the adhesion face 33 functions as a polarized light separation means.

The laser beam L equally divided into the P polarized light component Lp and the S polarized light component Ls by the polarized light rotation means 20 is incident normally on the third face 32c of the sub prism 32 of the first prism 30 (see FIG. 2).

Of the laser beam L entering into the sub prism 32, the P polarized light component Lp is transmitted, almost 100%, through the polarized light beam splitter 21 provided at the adhesion face 33 into the main prism 31. On the other hand, the S polarized light component Ls is reflected, almost 100%, by the polarized light beam splitter 21, and goes out through the second face 32b of the sub prism 32 to the exterior of the first prism 30 (see FIG. 2).

The P polarized light component Lp entering into the main prism 31 undergoes internal reflection successively on the fourth face 31d, the third face 31c, and the first face 31a of the main prism 31, then returns to the polarized light beam splitter 21, is transmitted through the polarized light beam splitter 21 and through the first face 32a of the sub prism 32 into the sub prism 32, and thereafter goes out through the second face 32b of the sub prism 32 to the exterior of the first prism 30 (see FIG. 2).

In this instance, the entering position and the outgoing position of the P polarized light component Lp at the polarized light beam splitter 21 of the main prism 31 coincide with each other, and, therefore, the S polarized light component Ls already reflected at the polarized light beam splitter 21 and the P polarized light component Lp are synthesized with each other (see FIG. 2).

In addition, between the P polarized light component Lp and the S polarized light component Ls thus synthesized, an optical path difference L1 corresponding to the repeated internal reflection of the P polarized light component Lp in the main prism 31 as above-described is generated (see FIG. 2).

In the above-mentioned specific example of the dimensions, the difference between the optical path length of the P polarized light component Lp and the optical path length of the S polarized light component Ls is 80 mm; thus, the optical path difference (L1=80 mm) between both the polarized light components is greater than the coherence length of 60 mm of the laser beam L.

Thus, the first prism 30 has the function of the polarized light separation means 21 for separating the P polarized light component Lp and the S polarized light component Ls from each other and the function of the optical path difference generation means 22 for generating a difference between the optical path lengths of the polarized light components.

Meanwhile, it is known that in order to suppress speckle noise, it is effective to generate a plurality of speckle patterns having no correlation with each other by use of a plurality of laser beams not interfering with each other and to superpose the plurality of speckle patterns on each other.

Since the P polarized light component and the S polarized light component do not have coherence, it may be considered that simply equally dividing into the components is effective for suppressing the speckle noise. In practice, however, at the time when the P polarized light component and the S polarized light component are scattered by reflection on the screen 11, canceling of the polarization occurs; therefore, the scattering of the P polarized light contains P polarized light (referred to as PP component) and S polarized light (referred to as PS component), and the scattering of the S polarized light contains S polarized light (referred to as SS component) and P polarized light (referred to as SP component).

Accordingly, when equal division into the P polarized light component and the S polarized light component is only conducted, the PP component and the SP component interfere with each other, while the SS component and the PS component interfere with each other, resulting in that sufficient suppression of speckle noise is not achieved.

In view of this, in addition to the equal division into the P polarized light component and the S polarized light component, as above described, the optical path difference L1 (in the above embodiment, 80 mm) not less than the coherence length (60 mm) is generated between the polarized light components, whereby the laser beams of both the components are made to have no correlation with each other, resulting in that the speckle noise can be suppressed.

The beam intensity separation means 23 is provided in a second prism 40 having a predetermined shape, separates the intensities of the laser beams (the P polarized light component and the S polarized light component) from each other to form two laser beams parallel to each other and generates an optical path difference L2 not less than the coherence length (60 mm) between the thus separated two laser beams.

More specifically, the second prism 40 is comprised of a main prism 41 having a fixed plate thickness and a flat, hexagonal, prismatic shape and a sub prism 42 having a plate thickness equal to that of the main prism 41 and a flat, isosceles, right triangular, prismatic shape. One face of the main prism 41 where the plate thickness appears and one face of the sub prism 42 where the plate thickness appears are adhered to each other to form an irregular-shaped hexagonal prism (see FIGS. 4 and 5).

The main prism 41 has a shape in which each pair of opposed sides are parallel to each other but are different in length. Specific dimensions of each portion of the main prism 41 are as follows. The corner at the top end in FIG. 4 is named "first corner 41A", and the other corners are named, in the clockwise order, "second corner 41B", "third corner 41C", . . . , and "sixth corner 41F". The face between the first corner 41A and the second corner 41B is named "first face 41a", and the other faces are named, in the clockwise order, "second face 41b", "third face 41c", . . . , and "sixth face 41f" (see FIG. 4).

Angle of the first corner 41A=90°

Angle of the second corner 41B=135°

Angle of the third corner 41C=135°

Angle of the fourth corner 41D=90°

Angle of the fifth corner 41E=135°

Angle of the sixth corner 41F=135°

Spacing between the first corner 41A and the second corner 41B: 11 mm/sin 45°≈15.554 mm Spacing between the second corner 41B and the third corner 41C: 50 mm Spacing between the third corner 41C and the fourth corner 41D: 15 mm/sin 45°≈21.21 mm Spacing between the fourth corner 41D and the fifth corner 41E: 15 mm/sin 45°≈21.21 mm Spacing between the fifth corner 41E and the sixth corner 41F: 42 mm Spacing between the sixth corner 41F and the first corner 41A: 19 mm/sin 45°≈26.866 mm Spacing between the second face 41b and the fifth face 41e: 30 mm Spacing between the first corner 41A and the fourth corner 41D: 76 mm On the other hand, specific dimensions of the sub prism 42 are as follows. The corner at the left end in FIG. 4 is named "first corner 42A", and the other corners are named, in the clockwise order, "second corner 42B", and "third corner 42C". The face between the first corner 42A and the second corner 42B is named "first face 42a", and the other faces are named, in the clockwise order, "second face 42b", and "third face 42c" (see FIG. 4).

Angle of the first corner 42A=45°

Angle of the second corner 42B=90°

Angle of the third corner 42C=45°

Spacing between the first corner 42A and the second corner 42B: 11 mm

Spacing between the second corner 42B and the third corner 42C: 11 mm

Spacing between the third corner 42C and the first corner 42A: 11 mm/sin 45°≈15.554 mm The third face 42c of the sub prism 42 is adhered to the first face 41a of the main prism 41, and a half-mirror 23 is provided at the adhesion face 43, to constitute the second prism 40 (see FIG. 4). The half-mirror 23 provided at the adhesion face 43 functions as a beam intensity separation beams. The adhesion of the sub prism 42 to the main prism 41 is conducted for ensuring that the plane of entrance of the laser beam L into the second prism 40 is orthogonal to the optical axis of the laser beam L. This ensures that the laser beam L, at the time of entrance into the main prism 41, can pass along a predetermined optical path without refraction (see FIG. 4).

The P polarized light component Lp and the S polarized light component Ls having passed through the first prism 30 and synthesized with each other are incident normally on the first face 42a of the sub prism 42 of the second prism 40 (see FIG. 4).

Of the laser beam L entering into the sub prism 42, about 50% is reflected at right angle by the half-mirror 23, and goes out through the second face 42b of the sub prism 42. The remaining 50% of the laser beam L is transmitted through the half-mirror 23 and enters into the main prism 41 (see FIG. 4).

The laser beam L entering into the main prism 41 undergoes internal reflection successively on the third face 41c, the fourth face 41d, and the sixth face 41f of the main prism 41, and then goes out through the second face 41b (see FIG. 4).

In this instance, the laser beam passing through the inside of the main prism 41 while undergoing internal reflection passes along such a path that the position of entrance thereof into the main prism 41 through the half-mirror 23 and the position of outgoing through the second face 41b are staggered from each other. Therefore, the laser beam reflected on the half-mirror 23 and the laser beam having passed through the inside of the main prism 41 are not synthesized with each other, take different optical paths, and are parallel to each other (see FIG. 4).

In the above-mentioned specific example of the dimensions, the spacing between the two laser beams parallel to each other is equal to the difference (in height) between the lowermost position of the first face 41a and the lowermost position of the sixth face 41f, namely, 8 mm (see FIG. 4).

In addition, between the laser beam reflected by the half-mirror 23 and the laser beam having passed through the inside of the main prism 41, an optical path difference L2 corresponding to the repeated internal reflection in the main prism 41 of the laser beam having passed through the inside of the main prism 41 is generated.

In the above-mentioned specific example of the dimensions, the difference between the optical path length of the laser beam having passed through the inside of the main prism 41 and the optical path length of the laser beam reflected by the half-mirror 23 is 152 mm; thus, the optical path difference L2 (L2=152 mm) between both the laser beams is greater than the coherence length of 60 mm of the laser beam L.

Thus, the second prism 40 includes the function of separating from each other the intensities of the two polarized light components Lp and Ls into which the laser beam L has been separated by the first prism 30 and which have been provided with the optical path difference therebetween and the function of causing the optical paths of the laser beams having undergone the intensity separation to be two parallel optical paths and generating an optical path difference not less than the coherence length of the laser beam between the two laser beams having undergone the intensity separation.

As a result, the second prism 40 separates the laser beam L into two laser beams, which are incident on the screen 11 at mutually different angles, to generate different speckle patterns.

In addition, the two laser beams have the optical path difference L2 (in the above embodiment, 152 mm) not less than the coherence length (60 mm), so that they do not have coherence. Therefore, irradiation with the two laser beams having the optical path difference greater than the coherence length is equivalent to illumination by two light sources having no correlation with each other, which enables further suppression of speckle noise.

While separating a laser beam into two laser beams on an intensity basis has been described in the above embodiment, the number of laser beams after the intensity separation in the present invention is not limited to the value of two, and separation into a multiplicity of laser beams insofar as being allowed by the condensing capability (F value) of the optical system is included within the technical scope of the present invention. When the laser beam is separated on an intensity basis into as large a number of laser beams as possible, it is possible to further suppress the speckle noise.

The line generator expander optical system 4 converts the beam shapes of the plurality of laser beams outgoing from the second prism 40 into line form beams optimal for illuminating the one-dimensional spatial modulation device and is generally composed of a cylindrical lens (see FIG. 1).

Figure 7:
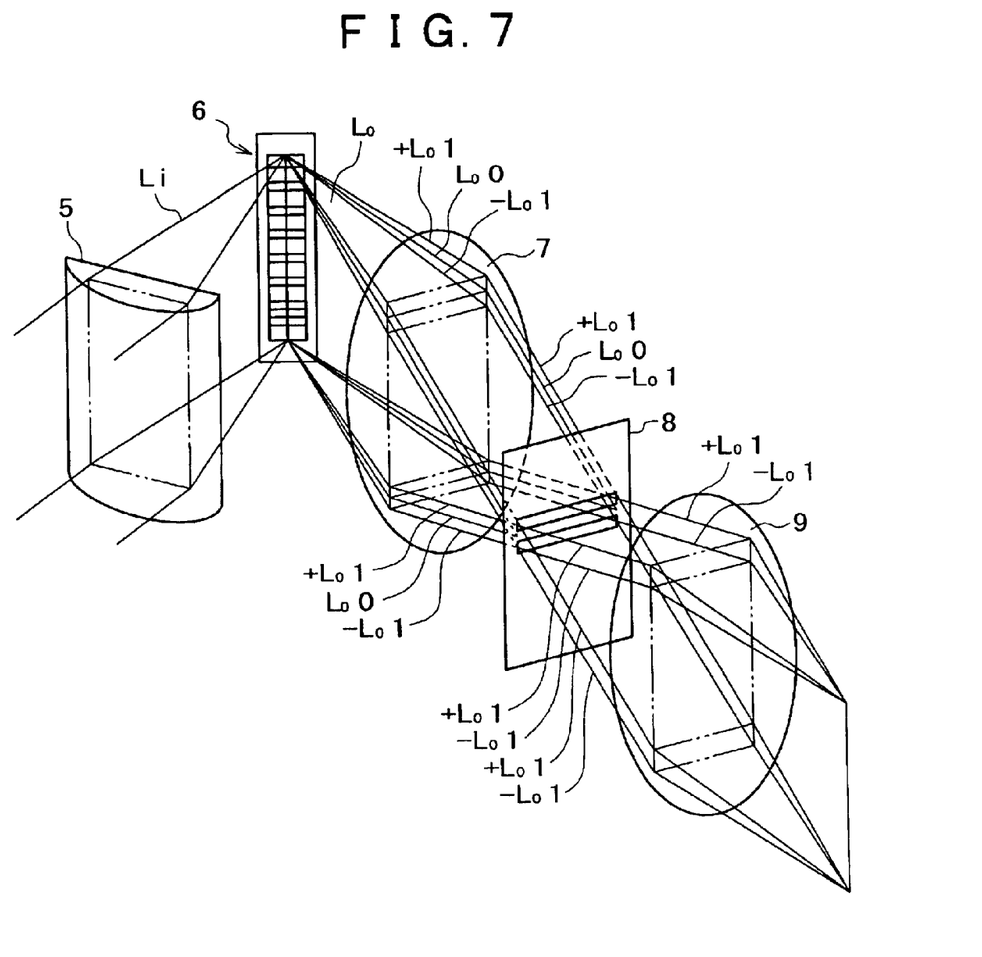
FIG. 7 is a perspective view generally showing the optical relationship between the grating light valve and a schlieren filter.

The focus lens 5 is a lens for converging the plurality of line-form beams shaped by the line generator expander optical system 4 onto one point (one line) on the one-dimensional spatial modulation device and is generally composed of a cylindrical lens (see FIGS. 1 and 7).

Figure 6A:
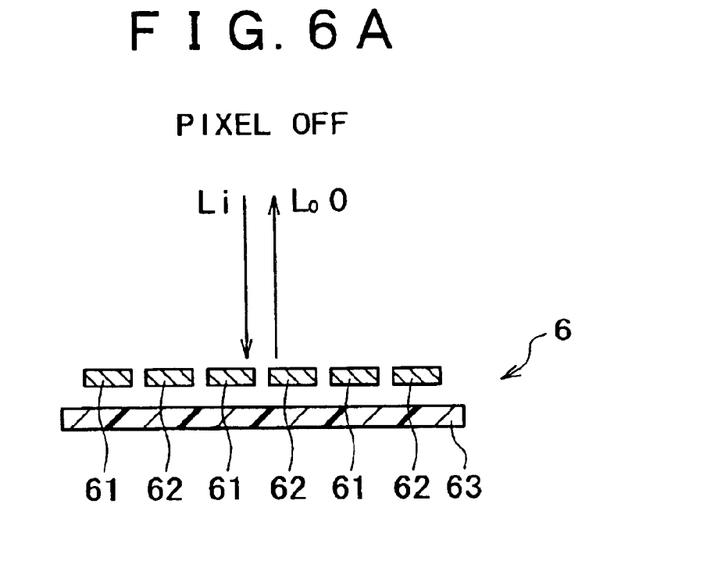
Figure 6B:
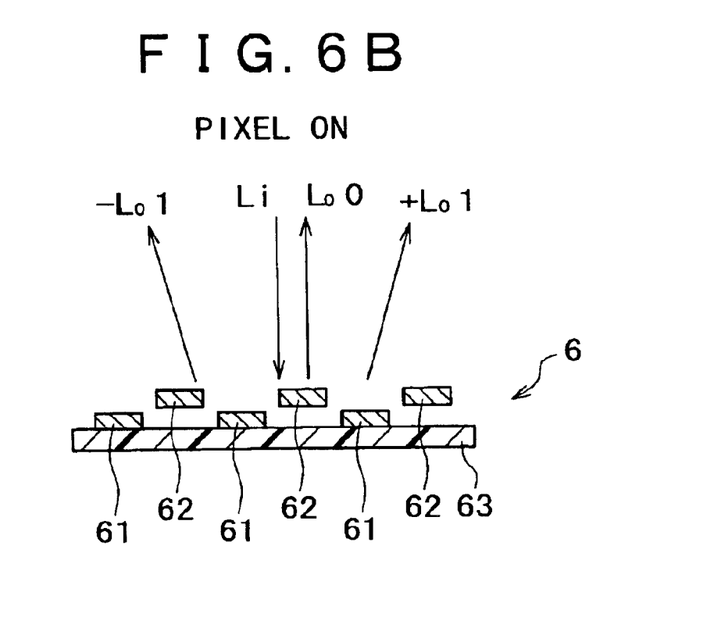

The GLV 6 is a reflective-type spatial modulation device having a structure in which a multiplicity of band form minute ribbons (also called membranes) 61, 62, 61, 62, . . . arranged side by side on a substrate 63 with an air gap therebetween (see FIG. 6). Of the ribbons 61, 62, 61, 62, . . . , for example, a set of six ribbons constitute one pixel. A multiplicity of the pixels, for example, 1080 pixels are arranged in the longitudinal direction, namely, in the direction of extension of the line form beams shaped by the line generator expander optical system 4. The whole part of the GLV 6 is in a line form, which has, for example, a longitudinal dimension of 28 mm and a widthwise dimension (the length of the ribbons) of 200 μm. Each of the ribbons 61 and 62 has a width of about 3 to 4 μm and is formed on the substrate 63 by a silicon process. The GLV 6 is provided with several thousand ribbons 61, 62, . . . in the width direction of the ribbons 61, 62, . . . ; for example, 6480 ribbons are arranged in the longitudinal direction.

Wirings and electric circuits are so provided that a common voltage is impressed on three every other ribbons 61, 61, 61 of the six ribbons 61, 62, 61, 62, 61, 62 constituting one pixel. When no voltage is impressed (when the pixels are turned off: Pixel Off), the six ribbons 61, 62, 61, 62, 61, 62 have their surfaces in the same plane, to function as a flat surface reflective mirror, so that the incident beam Li undergoes specular reflection (see FIG. 6A).

On the other hand, when the voltage is impressed (when the pixels are turned on: Pixel On), the ribbons 61, 61, 61 are displaced to the side of the substrate 63 under electrostatic forces, and the surfaces of the ribbons 61, 62, 61, 62, 61, 62 constitute a surface with alternate fable recesses and projections, so as to function as a diffraction grating, whereby the reflected beam Lo is separated into a specularly reflected component (0th order beam) Lo0 and a diffracted component (±first order diffracted beam) ±Lo1 (see FIG. 6B). The intensity of the ±first order diffracted beam ±Lo1 is maximized when the displacement of the ribbons 61, 61, 61 is equal to ¼ times the wavelength of the incident beam Li.

The light beams "+Lo1, Lo0, −Lo1" shown in the figure represent the diffracted beams generated by the GLV6, in which "Lo1" denotes the +first order diffracted beam, "Lo0" denotes the 0th order (diffracted) beam, and −Lo1 denotes the −first order diffracted beam.

In forming an image by use of the GLV 6, the ribbons 61, 61, 61 are driven by an image signal, so as to shield the 0th order beam Lo0 separated by the GLV 6 and to pick up only the ±first order beam Lo1, whereby an intensity modulation on a pixel basis is achieved. Namely, the GLV 6 functions as a one-dimensional spatial modulation device.

For selecting only the first order diffracted beams ±Lo1, the schlieren filter 8 for performing spatial filtering (schlieren filtering) on the Fourier plane of the GLV 6 is provided (see FIGS. 1 and 7).

The schlieren filter 8 is disposed in the vicinity of the one-dimensional image formed by the relay optical system 7, i.e., at the pupil position of the relay optical system 7. This arrangement is for separating the ±first order diffracted beams ±Lo1 and the beams reflected/diffracted in other directions from each other at a high contrast and because the two components are spatially most separated from each other at the pupil position (see FIG. 1).

Incidentally, as the relay optical system 7, a projection-type one, as shown in FIG. 1, may be used, and a reflection-type one, such as a so-called offner-type relay system, also may be used.

FIG. 7 shows an essential part of the schlieren filter optical system. The light beams from a light source not shown in FIG. 7 are condensed by the focus lens 5 to irradiate the GLV 6 therewith, and the diffracted beams are transmitted through the relay optical system 7, the schlieren filter 8 and the projection lens system 9, in this order, before going out.

Incidentally, the schlieren filter 8 is classified into a schlieren filter for transmitting only the ±first order diffracted beams ±Lo1 (hereinafter referred to as "transmission-type schlieren filter") and a schlieren filter for reflecting only the ±first order diffracted beams ±Lo1 (hereinafter referred to as "reflection-type schlieren filter). The term "transmission" used herein includes the meaning of simple "passage".

The transmission-type schlieren filter is constituted by providing a shield plate with openings or transmissive portions for transmission of the ±first order diffracted beams, whereas the reflection-type schlieren filter is constituted by providing the shield plate with reflective portions for reflecting the ±first order diffracted beams ±Lo1.

Here, description will be made by taking the transmission-type schlieren filter 8 as an example (see FIG. 7).

The transmission-type schlieren filter 8 includes the shield plate 81 provided with two rectangular openings 82, 82 at appropriately spaced positions, and the openings 82, 82 are formed in such a size as to transmit only the ±first order diffracted beams Lo1, whereby the zero order beam Lo0 is shielded and only the ±first order diffracted beams ±Lo1 are filtered through (see FIG. 7).

In order to display a full-color two-dimensional image by use of the GLV 6 and the schlieren filter 8, it is necessary to use laser beams in three colors of R (red), G (green), and B (blue) and to illuminate three GLVs (spatial modulation devices) 6, 6, 6 corresponding respectively thereto. The laser beams modulated by the three GLVs 6, 6, 6 are then synthesized with each other, whereby a full-color two-dimensional image can be displayed.

By controlling the GLV 6 by the image signal, as described above, the ±first order diffracted beams ±Lo1 are modulated, a stepless gradation can be realized, and a one-dimensional image is formed (see FIGS. 6 and 7).

Next, the ±first order diffracted beams Lo1 are transmitted through the projection lens system 9, whereby the one-dimensional image is enlargedly projected (see FIG. 1).

Then, the one-dimensional image enlarged by the projection lens system 9 is scanned by the galvano-mirror 10 in a direction orthogonal to the one-dimensional image direction, whereby a two-dimensional image is displayed on the screen 11 (see FIG. 1).

Incidentally, as for drive control means for the GLV 6 and the galvano-mirror 10 and the like, showing in figures and description are omitted. Besides, while the galvano-mirror 10 has been shown as a means for converting the one-dimensional image into the two-dimensional image in the above-described embodiment, the conversion means is not limited to this, and other mechanical light scanners such as a polygon mirror can also be used.

In the above image display unit 1, the laser beam can be equally divided into the P polarized light component and the S polarized light component by the polarized light rotation means 20, and the optical path difference L1 (=80 mm) not less than the coherence length (60 mm) can be provided between the P polarized light component and the S polarized light component by the polarized light separation means 21 and the optical path difference generation means 22, whereby both laser beams (P polarized light component and the S polarized light component) can be made to have no correlation with each other, and, as a result, speckle noise can be suppressed.

In addition, light intensity separation of the P polarized light component and the S polarized light component can be achieved by the half-mirror 23, and the optical path difference L2 (=152 mm) not less than the coherence length (60 mm) can be provided between the two P polarized light components having undergone the light intensity separation and between the two S polarized light components having undergone the light intensity separation by the main prism 41 of the second prism 40. Besides, it is possible to generate a multiplicity of speckle patterns which have different optical paths, i.e., which have no correlation with each other, and to further suppress the speckle noise.

Moreover, in the above-described image display unit 1, the polarized light separation means 21 and the optical path generation means 22 are configured in the first prism 30, which is one optical component part, so that the number of component parts can be reduced.

Furthermore, in the above-described image display unit 1, the absolute value (|80 mm−152 mm|=72 mm) of the difference between the optical path difference L1 (=80 mm) generated by the optical path difference generation means 22 and the optical path difference L2 (=152 mm) generated by the main prism 41 is not less than the coherence length (60 mm), so that, even where the separation ratio in separation by the polarized light beam splitter 21 is less than 100%, it is possible to restrain the generation of interference fringes on the screen 11 and to suppress the speckle noise.

Now, description will be made of the case where the separation ratio in separation by the polarized light beam splitter 21 is less than 100% (see FIG. 8).

Figure 8:
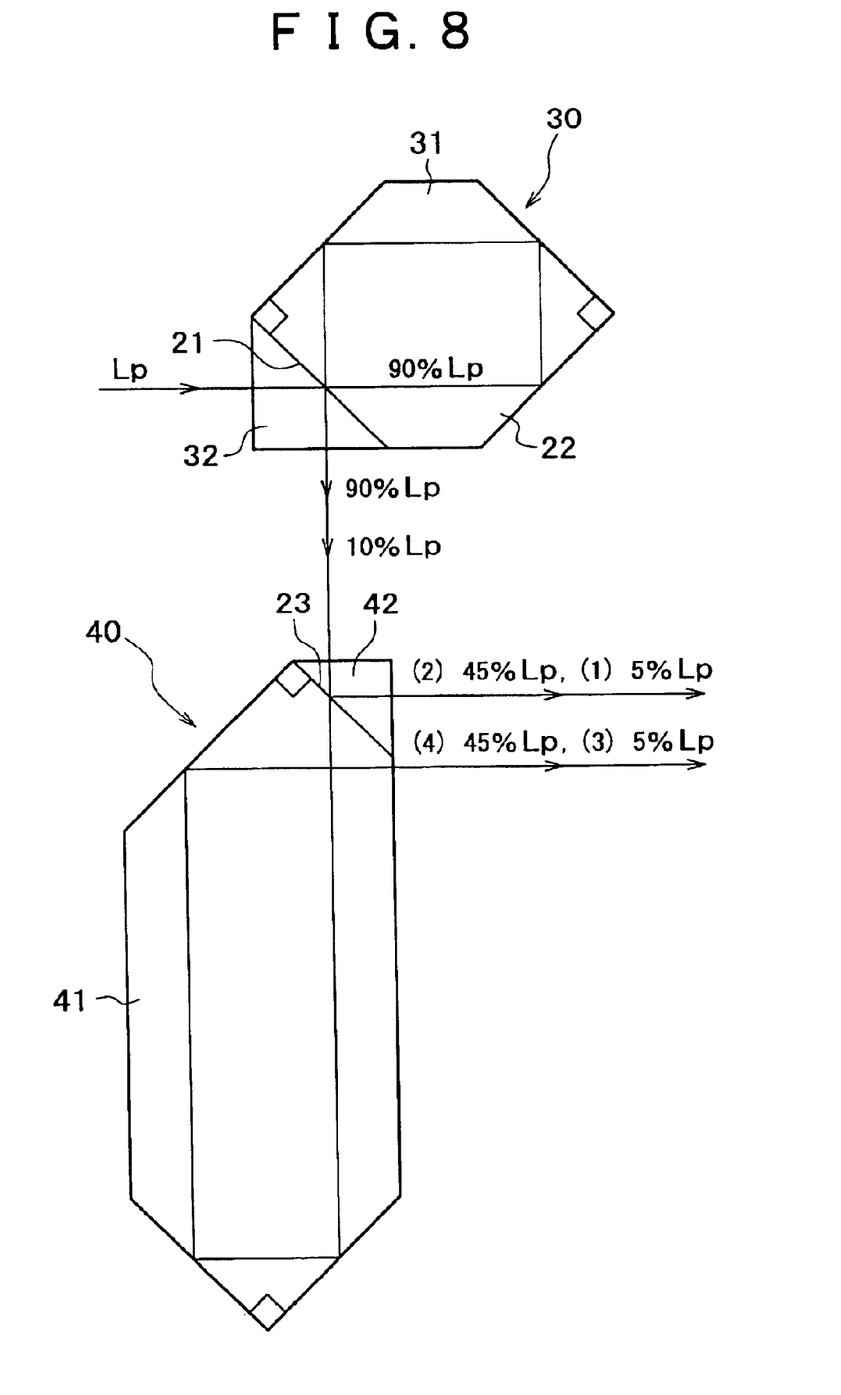
FIG. 8 is a plan view for illustrating the optical path of a laser beam of each polarized light component in a polarized light separation means and an optical path difference generation means.

For example, where the separation ratio in separation by the polarized light beam splitter 21 is 90%, 90% of the P polarized light component passes through the first main prism 31 while being given the optical path difference L1, before going out through the first prism 30, whereas the remaining 10% is not separated by the polarized light beam splitter 21 and goes out of the first prism 30 while remaining synthesized with the S polarized light component (see FIG. 8).

Of the polarized light component (90% of all the P polarized light components) given the optical path difference L1 (80 mm), 50% (45% of all the P polarized light components) is reflected by the half-mirror 23 to go out through the second prism 40, whereas the remaining 50% (45% of all the P polarized light components) passes through the second main prism 41 while being given the optical path difference L2 (152 mm) to go out through the second prism 40 (see FIG. 8).

Besides, of the P polarized light component not separated by the polarized light beam splitter 21 (the left polarized light component), which enters the second prism 40 while remaining synthesized with the S polarized light component, 50% (5% of all the P polarized light component) is reflected by the half-mirror 23 to go out through the second prism 40, whereas the remaining 50% (5% of all the P polarized light component) passes through the second main prism 41 while being given the optical path difference L2 (152 mm) to go out of the second prism 40. Incidentally, only the laser beams Lp of the P polarized light component are shown in FIG. 8.

In summing up the above, the laser beam Lp of the P polarized component is divided into four components: the component which undergoes total reflection on the polarized light beam splitter 21 and the half-mirror 23 (hereinafter referred to as "component (1)"; the component which is transmitted through the polarized light beam splitter 21, passes through the inside of the first prism 30 and undergoes total reflection on the half-mirror 23 (hereinafter referred to as "component (2)"); the component which undergoes total reflection on the polarized light beam splitter 21, is transmitted through the half-mirror 23 and passes through the inside of the second main prism 41 (hereinafter referred to as "component (3)"); and the component which is transmitted through the polarized light beam splitter 21, passes through the inside of the first prism 30, is transmitted through the half-mirror 23 and passes through the inside of the second main prism 41 (hereinafter referred to as "component (4)") (see FIG. 8).

Taking the optical path length of the laser beam of component (1) as a reference, the laser beam of component (2) has an optical path difference L(2) relative to the laser beam of component (1) (hereinafter referred to simply as "optical path difference of component (2)") of L1 (80 mm), the laser beam of component (3) has an optical path difference L(3) relative to the laser beam of component (1) (hereinafter referred to simply as "optical path difference of component (3)") of L2 (152 mm), and the laser beam of component (4) has an optical path difference L(4) relative to the laser beam of component (1) (hereinafter referred to simply as "optical path difference of component (4)") of L1+L2 (80+152=232 mm) (FIG. 8).

If the absolute value of the difference between the optical path difference L(2) of component (2) of the P polarized light components and the optical path difference L(3) of component (3) is smaller than the coherence length, namely, where the relationship of |L(2)–L(3)|< coherence length (60 mm) is established, the laser beam of component (2) and the laser beam of component (3) form an interference fringe on the screen 11, thereby generating a speckle noise.

On the other hand, in the image display unit 1 in the above-described embodiment, the absolute value of the difference between the optical path difference L(2) of component (2) and the optical path difference L(3) of component (3) is greater than the coherence length, i.e., the relationship of |L(2) (80 mm)–L(3) (152 mm)|> coherence length (60 mm) is established, so that the laser beam of component (2) and the laser beam of component (3) would not form an interference fringe on the screen 11.

Therefore, in the image display unit 1 described above, even where the separation ratio in separation by the polarized light beam splitter 21 is less than 100%, it is possible to prevent the polarized light component on one side which has not been separated (the left polarized light component) and the polarized light component on one side that has been separated from forming an interference fringe on the screen and to suppress the noise on the screen, because the absolute value of the difference between the optical path difference L1 generated by the optical path difference generation means 22 and the optical path difference L2 generated by the main prism 41 has been set to be not less than the coherence length.

Figure 9:
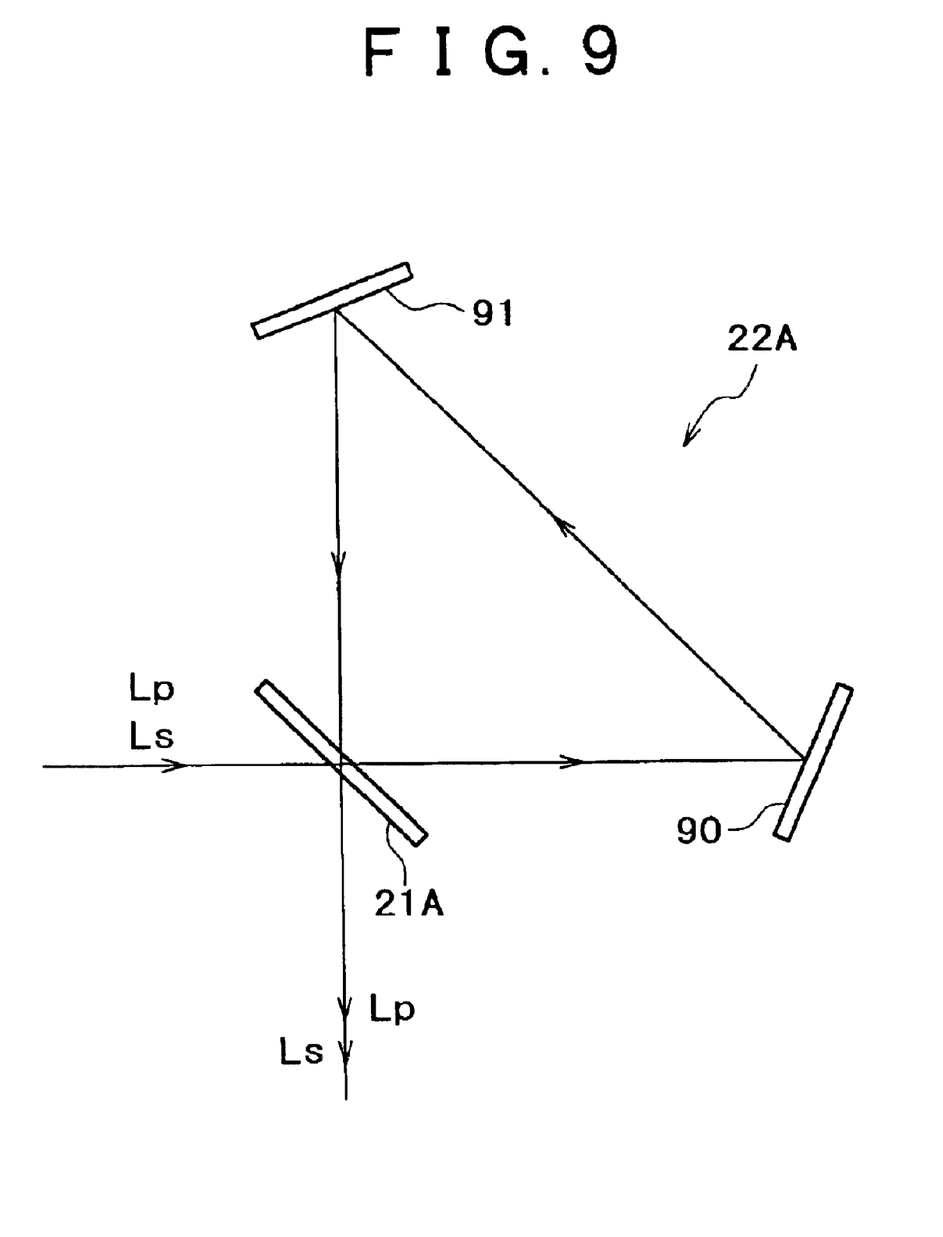
FIG. 9 is a plan view generally showing a modified embodiment of the polarized light separation means and the optical path difference generation means.

FIG. 9 shows a modified embodiment of the polarized light separation means and the optical path difference generation means.

A polarized light separation means 21A is disposed at the stage next to the polarized light rotation means 20, like the polarized light separation means 21, and is configured as a flat plate form polarized light beam splitter 21A.

The polarized light beam splitter 21A is disposed at an inclination angle of 45° to the optical axis, whereby it is ensured that the laser beam of the P polarized light component is transmitted substantially straightforward through the polarized light beam splitter 21A, whereas the laser beam of the S polarized light component is reflected by the polarized light beam splitter 21A into a direction substantially orthogonal to the laser beam of the P polarized light component (see FIG. 9).

At the stage next to the polarized light beam splitter 21A and on the side where the laser beam of the P polarized light component has advanced, there is disposed an optical path difference generation means 22A composed of two total reflection mirrors 90 and 91 (see FIG. 9).

The first total reflection mirror 90 is so disposed that the laser beam of the P polarized light component transmitted through the polarized light beam splitter 21A is reflected at an incidence angle of 45°/2=22.5° (see FIG. 9).

The second total reflection mirror 91 is so disposed that the laser beam of the P polarized light component reflected by the first total reflection mirror 90 is reflected at an incidence angle of 45°/2=22.5°, and the reflected laser beam returns to the position of incidence on the polarized light beam splitter 21A (see FIG. 9).

In addition, the two total reflection mirrors 90 and 91 are disposed in such a positional relationship that the optical path length of the laser beam of the P polarized light component having passed through the optical path difference generation means 22A is 80 mm (see FIG. 9).

Further, the laser beam of the P polarized light component having passed through the optical path difference generation means 22A is again transmitted through the polarized light beam splitter 21A, so as to be synthesized with the laser beam of the S polarized light component.

In the polarized light beam splitter 21A and the optical path difference generation means 22A according to this modified embodiment, also, the laser beam is separated into the laser beam of the P polarized light component and the S polarized light component, and the optical path difference is generated between the laser beams of both the components. Therefore, the polarized light beam splitter 21A and the optical path difference generation means 22A according to this modified embodiment have a function equivalent to that of the first prism 30 described above.

The optical path difference generation means 22A is set so that the optical path difference between the laser beam of the P polarized light component and the laser beam of the S polarized light component is 80 mm, in the same manner as the first prism 30 described above. This ensures that the optical path difference between the laser beam of the P polarized light component and the laser beam of the S polarized light component is greater than the coherence length of 60 mm, and both the laser beams (the P polarized light component and the S polarized light component) can be made to have no correlation with each other, resulting in that speckle noise can be suppressed.

Figure 10:
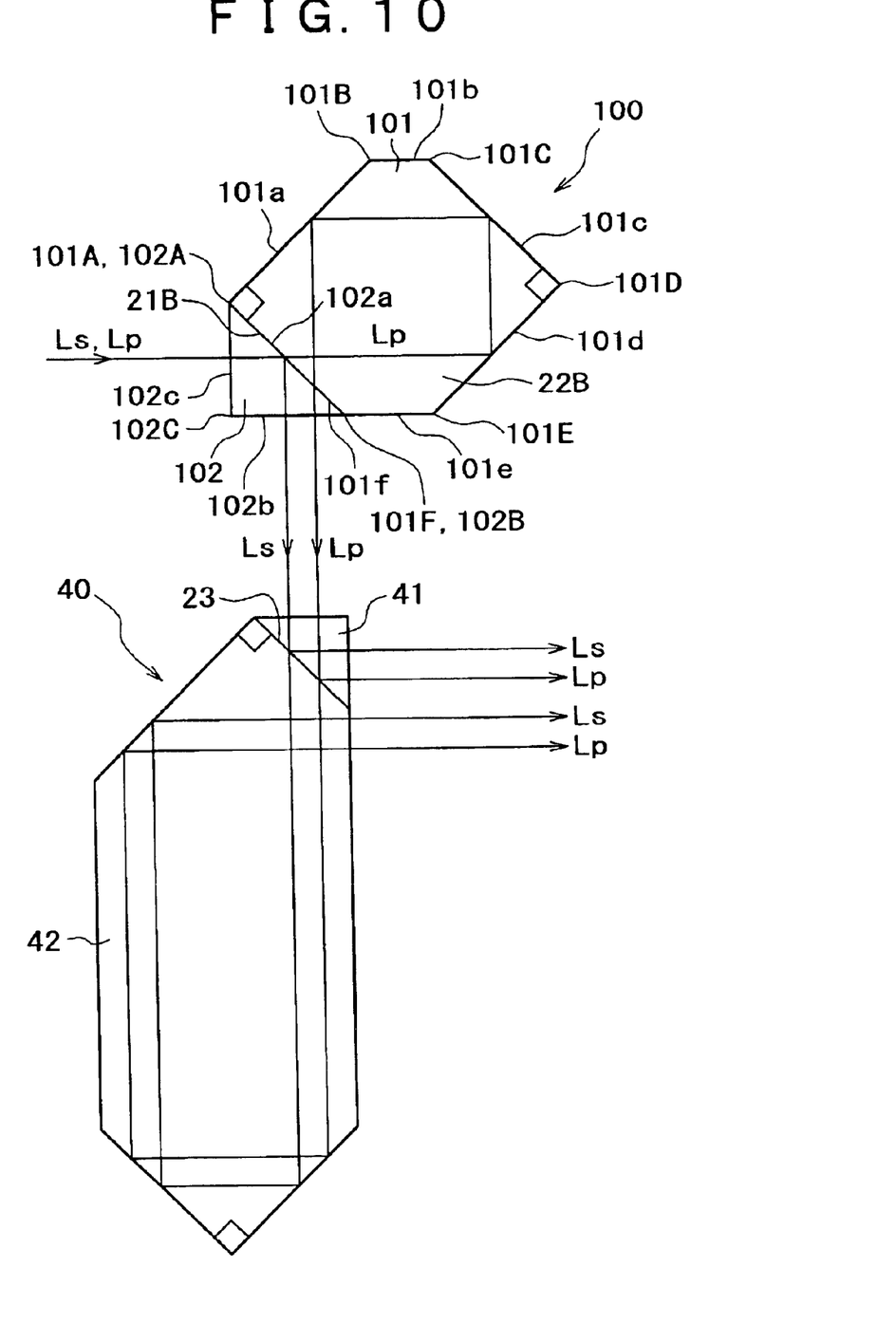
FIG. 10 is a plan view generally showing another modified embodiment of the polarized light separation means and the optical path difference generation means.

FIG. 10 shows another embodiment of the polarized light separation means and the optical path difference generation means, together with the beam intensity separation means 40.

The polarized light separation means 21B and the optical path difference generation means 22B according to this modified embodiment are constituted as one prism (hereinafter referred to as "third prism") 100 (see FIG. 10).

The third prism 100 differs from the first prism 30 in that, while the first prism 30 is for separating the laser beam of the P polarized light component and the laser beam of the S polarized light component from each other and thereafter synthesizing both of them with each other, the third prism 100 is for separating the laser beam of the P polarized light component and the laser beam of the S polarized light component from each other but not thereafter synthesizing both the polarized light components with each other. Therefore, the laser beam of the P polarized light component and the laser beam of the S polarized light component after passing through the third prism 100 take different optical paths (see FIG. 10).

Specifically, the third prism 100 is comprised of a main prism 101 having a fixed plate thickness and a flat hexagonal prismatic shape and a sub prism 102 having a plate thickness equal to that of the main prism 101 and a flat isosceles right triangular prismatic shape. One face of the main prism 101 where the plate thickness appears and one face of the sub prism 102 where the plate thickness appears are adhered to each other to form an irregularly-shaped hexagonal prism (see FIG. 10).

The main prism 101 is so shaped that each pair of opposed sides are parallel to each other but are different in length. Of the main prism 101, the corner at the left end in FIG. 10 is named "first corner 101A", and the other corners are named, in clockwise order, "second corner 101B", "third corner 101C", . . . , and "sixth corner 101F". The face between the first corner 101A and the second corner 101B is named "first face 101a", and the other faces are named, in clockwise order, "second face 101b", "third face 101c", . . . , and "sixth face 101f" (see FIG. 10).

Similarly, of the sub prism 102, the corner at the top end in FIG. 10 is named "first corner 102A", and the other corners are named, in the clockwise order, "second corner 102B" and "third corner 102C". The face between the first corner 102A and the second corner 102B is named "first face 102a", and the other faces are named, in clockwise order, "second face 102b" and "third face 102c" (see FIG. 10).

The first face 102a of the sub prism 102 is adhered to the sixth face 101f of the main prism 101 to constitute the third prism 100 (see FIG. 10).

A polarized light beam splitter 21B is provided at the adhesion face 103 and functions as a polarized light separation means. The adhesion of the sub prism 102 to the main prism 101 is for ensuring that the plane of entrance of the laser beam L into the third prism 100 is orthogonal to the optical axis of the laser beam L, whereby it is ensured that the laser beam L, upon entrance into the main prism 101, can pass along a desired optical path without refraction (see FIG. 10).

The laser beam L equally divided into the P polarized light component Lp and the S polarized light beam Ls by the polarized light rotation means 20 is incident normally on the third face 102c of the sub prism 102 of the third prism 100 (see FIG. 10).

Of the laser beam L having entered into the sub prism 102, the P polarized light component Lp is transmitted, almost 100%, through the polarized light beam splitter 21B provided at the adhesion face 103 to enter into the main prism 101. On the other hand, the S polarized light component Ls is reflected, almost 100%, on the polarized light beam splitter 21B and goes out of the third prism 100 through the second face 102b of the sub prism 102 (see FIG. 10).

The P polarized light component Lp having entered into the main prism 101 undergoes internal reflection successively on the fourth face 101d, the third face 101c, and the first face 101a of the main prism 101, returns to the polarized light beam splitter 21B, is transmitted through the polarized light beam splitter 21B, then enters into the sub prism 102 through the first face 102a of the sub prism 102, and thereafter goes out of the first prism 100 through the second face 102b of the first sub prism 102 (see FIG. 10).

In this instance, as for the laser beam of the P polarized light component having passed through the inside of the main prism 101 while undergoing the internal reflection, the position of entrance into the main prism 101 through the polarized light beam splitter 21B and the position of outgoing to the outside of the main prism 101 through the polarized light beam splitter 21B are staggered from each other. Therefore, the laser beam of the S polarized light component reflected on the polarized light beam splitter 21B and the laser beam of the P polarized light component having passed through the inside of the main prism 101 are not synthesized with each other, take different optical paths, and are parallel to each other (see FIG. 10).

When the laser beam of the P polarized light component and the laser beam of the S polarized light component, given the optical path difference therebetween and made to take different paths, have entered into the second prism 40, each of the laser beams of the polarized light components is further separated into two laser beams; thus, four laser beams separated from each other go out of the second prism 40 (see FIG. 10).

In the polarized light beam splitter 21B and the optical path difference generation means 22B according to this modified embodiment, it is possible to separate the laser beam into the laser beam of the P polarized light component and the laser beam of the S polarized light component, so as to generate an optical path difference between the laser beams of both the components and to cause the optical paths of the laser beam of the P polarized light component and the laser beam of the S polarized light component to be different from each other. Therefore, these laser beams reach the screen at mutually different angles, generating different speckle patterns, whereby the speckle noise can be further suppressed (see FIG. 10).

While the arrangement in which the polarized light separation means, the optical path difference generation means, and the beam intensity separation means are so disposed that the laser beam passes therethrough in this order has been described in the above embodiments, the inventions as set forth in claim 3 and claim 8 are not limited to this arrangement; for example, the beam intensity separation means may be disposed at the stage precedent to the polarized light separation means.

In addition, the specific shapes and structures of the individual parts shown in the above embodiments are merely some specific examples in carrying out the present invention and are, therefore, not to be construed as limitative of the technical scope of the invention.

What is claimed is:

1. An illuminating optical unit in an image display unit for forming an image by irradiating a spatial modulation device with a laser beam and modulating said laser beam based on an image signal inputted to said spatial modulation device, comprising:

polarized light rotation means for equally dividing a polarized light component of said laser beam into a P polarized light component and an S polarized light component;

polarized light separation means for separating from each other said P polarized light component and said S polarized light component equally divided by said polarized light rotation means; and optical path difference generation means for generating an optical path difference not less than the coherence length of said laser beam between a laser beam of said P polarized light component and a laser beam of said S polarized light component.

2. The illuminating optical unit in an image display unit as set forth in claim 1, wherein said polarized light separation means and said optical path difference generation means are constituted in the form of one prism.

3. The illuminating optical unit in an image display unit as set forth in claim 1, comprising:

beam intensity separation means for separating the intensity of said laser beam to form two or more laser beams parallel to each other and generating an optical path difference not less than the coherence length of said laser beam between said two or more separated laser beams.

4. The illuminating optical unit in an image display unit as set forth in claim 3, wherein the absolute value of the difference between said optical path difference generated by said optical path difference generation means and said optical path difference generated by said beam intensity separation means is not less than said coherence length.

5. The illuminating optical unit in an image display unit as set forth in claim 1, wherein said spatial modulation device is a grating light valve.

6. An image display unit for displaying an image by irradiating a spatial modulation device with a laser beam and modulating said laser beam based on an image signal inputted to said spatial modulation device, wherein illuminating optical unit for irradiating said spatial modulation device with said laser beam comprises:

polarized light rotation means for equally dividing a polarized light component of said laser beam into a P polarized light component and an S polarized light component;

polarized light separation means for separating from each other said P polarized light component and said S polarized light component equally divided by said polarized light rotation means; and optical path difference generation means for generating an optical path difference not less than the coherence length of said laser beam between a laser beam of said P polarized light component and a laser beam of said S polarized light component.

7. The image display unit as set forth in claim 6, wherein said polarized light separation means and said optical path difference generation means are constituted in the form of one prism.

8. The image display unit as set forth in claim 6, comprising:

beam intensity separation means for separating the intensity of said laser beam to form two or more laser beams parallel to each other and generating an optical path difference not less than the coherence length of said laser beam between said two or more separated laser beams.

9. The image display unit as set forth in claim 8, wherein the absolute value of the difference between said optical path difference generated by said optical path difference generation means and said optical path difference generated by said beam intensity separation means is not less than said coherence length.

10. The image display unit as set forth in claim 6, wherein said spatial modulation device is a grating light valve.

* * * * *